(12) United States Patent
Lu et al.

(10) Patent No.: US 7,750,580 B2
(45) Date of Patent: Jul. 6, 2010

(54) DIMMABLE, HIGH POWER FACTOR BALLAST FOR GAS DISCHARGE LAMPS

(75) Inventors: Ning Lu, Shenzhen (CN); Jun Liu, Jian Su Province (CN); Venugopal Ashokkumar, San Jose, CA (US)

(73) Assignee: U Lighting Group Co Ltd China (CN)

( * ) Notice: Subject to any disclaimer, the term of this patent is extended or adjusted under 35 U.S.C. 154(b) by 511 days.

(21) Appl. No.: 11/867,935

(22) Filed: Oct. 5, 2007

(65) Prior Publication Data

US 2008/0084168 A1    Apr. 10, 2008

Related U.S. Application Data

(60) Provisional application No. 60/849,952, filed on Oct. 6, 2006.

(51) Int. Cl.
H05B 37/00 (2006.01)
H05B 37/02 (2006.01)

(52) U.S. Cl. .................. 315/247; 315/224; 315/244; 315/291; 315/307

(58) Field of Classification Search ............ 315/171, 315/200 R, 209 R, 209 CD, 212, 224, 244–247, 315/272–276, 291, 307, 308, 361, DIG. 4, 315/DIG. 5
See application file for complete search history.

(56) References Cited

U.S. PATENT DOCUMENTS

| 4,392,086 | A | | 7/1983 | Ide et al. |
|---|---|---|---|---|
| 5,101,142 | A | | 3/1992 | Chatfield |
| 5,416,387 | A | | 5/1995 | Cuk et al. |
| 5,517,086 | A | | 5/1996 | El-Hamamsy et al. |
| 5,559,395 | A | | 9/1996 | Venkitasubrahmanian et al. |
| 5,872,430 | A | * | 2/1999 | Konopka .................. 315/219 |
| 5,994,848 | A | | 11/1999 | Janczak |
| 6,011,357 | A | | 1/2000 | Gradzki et al. |
| 6,043,611 | A | | 3/2000 | Gradzki et al. |
| 6,259,614 | B1 | * | 7/2001 | Ribarich et al. .............. 363/89 |
| 6,339,298 | B1 | | 1/2002 | Chen |
| 6,392,366 | B1 | | 5/2002 | Nerone |

(Continued)

*Primary Examiner*—Douglas W Owens
*Assistant Examiner*—Jimmy T Vu
(74) *Attorney, Agent, or Firm*—Heslin Rothenberg Farley & Mesiti P.C.

(57) ABSTRACT

A ballast for operating a compact fluorescent lamp includes a power factor correction circuit and an energy storage capacitor coupled to the output thereof. The power factor correction circuit is configured to draw current from an AC power source during substantially more than half of the cycle of the input AC voltage waveform; i.e., when operated such that full power is supplied to the lamp. Energy transfer elements in the power factor correction circuit extract energy from the AC power source via an input rectifier, even when the peak voltage of the AC voltage waveform is substantially lower than the voltage of the energy storage capacitor, and transfer the energy to the energy storage capacitor a sufficient number of times during for each cycle of the input AC voltage waveform (e.g., at least 500 times for each full cycle of a 60 Hz input AC voltage waveform for a lamp operated at a frequency of 30 kHz), such that the energy storage capacitor remains substantially fully charged during steady-state ballast operation. The power factor circuit additionally provides for improved dimming capability, specifically, dimming the discharge to low levels, while maintaining steady, non-flickering operation.

20 Claims, 4 Drawing Sheets

U.S. PATENT DOCUMENTS 6,459,214 B1 10/2002 Chen et al.
6,545,431 B2 4/2003 Hui et al.
6,784,622 B2 * 8/2004 Newman et al. ............ 315/219
6,998,795 B2 2/2006 Chiou

* cited by examiner

DIMMABLE, HIGH POWER FACTOR BALLAST FOR GAS DISCHARGE LAMPS

CROSS-REFERENCE TO RELATED APPLICATIONS

This application claims priority to U.S. Provisional Application No. 60/849,952, entitled "DIMMABLE, HIGH POWER FACTOR BALLAST FOR GAS DISCHARGE LAMPS", filed Oct. 6, 2006, which is hereby incorporated herein by reference in its entirety.

FIELD OF THE INVENTION

This invention relates generally to electronic ballasts for operating gas discharge lamps. More particularly, this invention relates to an electronic ballast with high input power factor and dimming capability for operating fluorescent lamps, including compact fluorescent lamps.

BACKGROUND OF THE INVENTION

Most compact fluorescent lamp ballasts draw current from the power line only during a relatively short time period near the peak of the input AC voltage waveform. Disadvantageously, this creates a highly distorted input current waveform that, in turn, causes the input power factor to be low, typically about 0.5 to 0.6. Another area for improvement in compact fluorescent lamps is dimming operation, specifically, dimming the lamp to low light levels, while maintaining steady, non-flickering operation.

Accordingly, it is desirable to provide a high power factor ballast for a discharge lamp, particularly a compact fluorescent lamp.

Further, it is desirable to provide a high power factor ballast having dimming capability.

Still further, it is desirable to provide a high power factor ballast having the capability to dim the discharge lamps to relatively low levels, while maintaining steady, non-flickering operation.

SUMMARY OF THE INVENTION

The shortcomings of the prior art are overcome and additional advantages are provided through the provision of a new and improved ballast for operating discharge lamps, including, for example, compact fluorescent lamps. In accordance with preferred embodiments, the ballast comprises a power factor correction circuit and an energy storage capacitor coupled to the output thereof. The power factor correction circuit is configured to draw current from an AC power source during substantially more than half of the cycle of the input AC voltage waveform; i.e., when operated such that full power is supplied to the lamp (e.g., without a phase cut dimmer between the ballast and the AC power line or when any such dimmer is adjusted to supply full power to the lamp). Energy transfer elements in the power factor correction circuit extract energy from the AC power source via an input rectifier, even when the peak voltage of the AC voltage waveform is substantially lower than the voltage of the energy storage capacitor, and transfer the energy to the energy storage capacitor a sufficient number of times during for each cycle of the input AC voltage waveform (e.g., at least 500 times for each full cycle of a 60 Hz input AC voltage waveform for a lamp operated at a frequency of 30 kHz), such that the energy storage capacitor remains substantially fully charged during steady-state ballast operation. The energy storage capacitor provides DC power to an inverter that is coupled to a starting circuit for initiating a discharge in the lamp.

In preferred embodiments, the power factor correction circuit not only provides high input power factor, but also advantageously provides for improved dimming capability, specifically, dimming the discharge to low levels, while maintaining steady, non-flickering operation. Advantageously, a power factor correction circuit in accordance with preferred embodiments of the present invention is compatible with presently available phase cut dimmers used, for example, with incandescent lamps.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
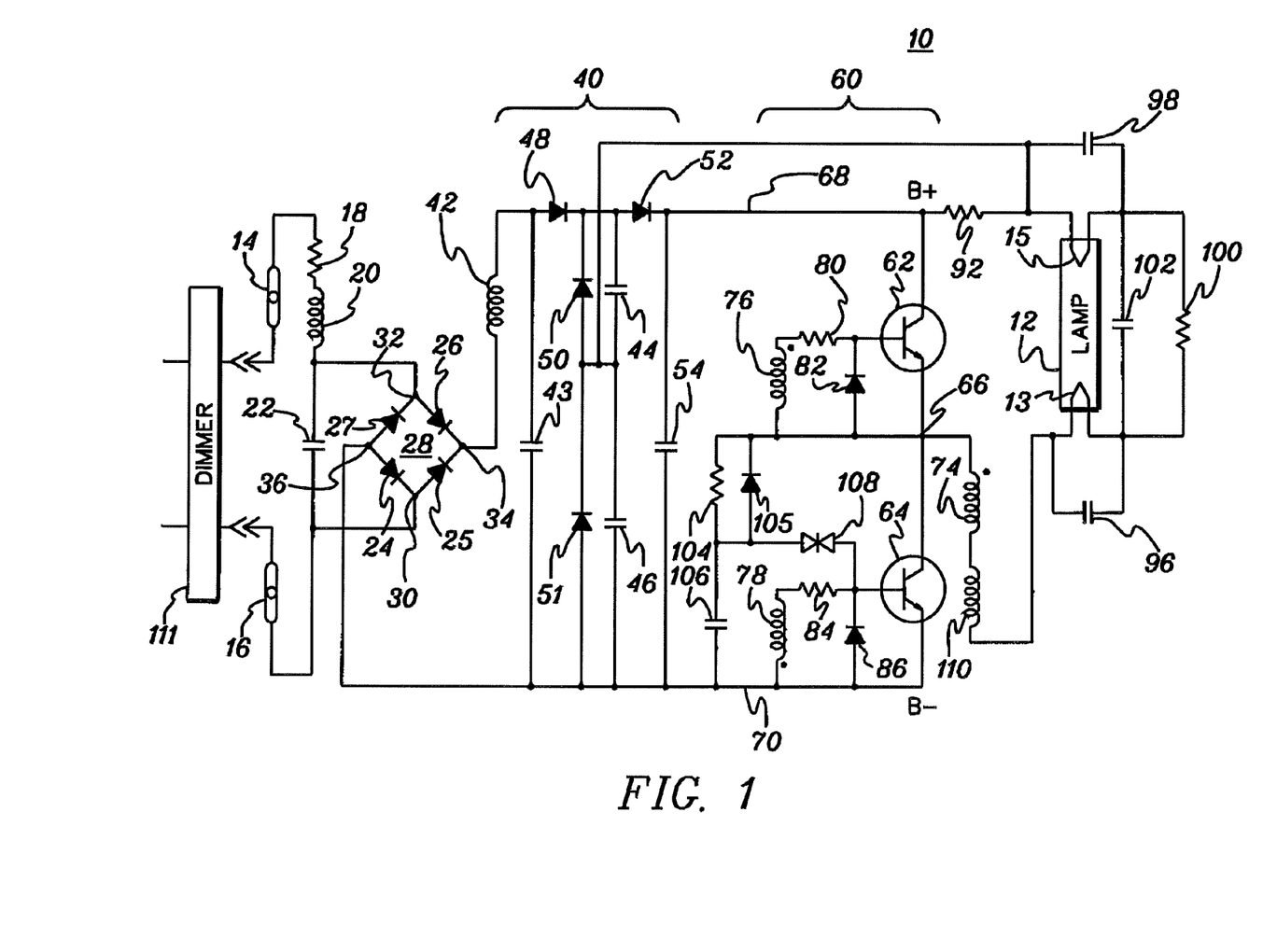
FIG. 1 schematically illustrates a dimmable, high power factor ballast in accordance with an aspect of the present invention.

FIG. 1 schematically illustrates a dimmable, high power factor ballast 10 for operating a gas discharge lamp 12 in accordance with the present invention. Discharge lamp 12 may comprise, for example, a compact fluorescent lamp (CFL). Although embodiments of the present invention are described herein with respect to CFL's, it is to be understood that the principles of the present invention are not limited to ballasts for CFL's, but are applicable to other types of discharge lamps.

In the embodiment of FIG. 1, ballast 10 receives AC power at terminals 14 and 16; and a resistor 18 reduces inrush current when power is first applied to the ballast. In preferred embodiments, resistor 18 is a negative temperature coefficient (NTC) resistor that has one value at room temperature and a lower value after the resistor has been heated by the current flowing through it and by the heat dissipated by the other components in the ballast. Use of an NTC resistor is well known in the art as a means to provide protection against high inrush currents when power is first applied to the ballast, while minimizing the power loss when the ballast is operating. An inductor 20 and a capacitor 22 function to reduce the amount of conducted electromagnetic interference that the ballast can impose on the power line. A fuse (not shown) is preferably connected in series with either AC input line (i.e., connected to terminal 14 or 16) to provide overcurrent protection in the event of a circuit failure or malfunction, as those of ordinary skill in the art will appreciate. Four diodes 24-27 are connected as a full wave bridge rectifier 28 (with junctions 30, 32, 34 and 36 respectively therebetween) that converts the AC voltage applied across junctions 30 and 32 into full-wave rectified DC voltage across junctions 34 and 36.

In accordance with the principles of the present invention, a power factor correction circuit 40 is coupled across the output of the bridge 28 at junctions 34 and 36 and comprises: an inductor 42 coupled at junction 34; a capacitor 43 coupled between one end of inductor 42 and junction 36; a diode 48 having its anode coupled at one end to inductor 42 and its cathode coupled to the junction joining a parallel combination of series-connected capacitors 44 and 46 and series-connected diodes 50 and 51. Another diode 52 is coupled to the junction joining the aforementioned parallel combination and a capacitor 54. Capacitor 54, which is coupled at the output of the power factor correction circuit, comprises an energy storage capacitor. Capacitor 54 reduces the relatively high level of modulation of the DC voltage produced by the full wave bridge 28. This modulation, also known as ripple, has a dominant frequency that is twice the power line frequency at the input to full wave bridge 28. For example, for a ballast operating from a 60 Hz power supply, the ripple would have a dominant frequency of 120 Hz.

A high frequency half-bridge inverter 60 is connected across energy storage capacitor 54. Inverter 60 is shown as comprising series-connected transistors 62 and 64. The junction 66 between the emitter of transistor 62 and the collector of transistor 64 is the first output terminal of inverter 60. DC power is supplied to the inverter from energy storage capacitor 54 through lines 68 (B+) and 70 (B−) connected respectively to the collector of transistor 62 and to the emitter of 64.

A base drive transformer (illustrated as having three windings 74, 76 and 78) is coupled to the output of inverter 60. The output current of the inverter flows first through primary winding 74 of the base drive transformer. The base drive transformer is illustrated in FIG. 1 as having two secondary windings 76 and 78. Dots on the illustrated transformer windings indicate the relative phase relationship of the voltages across the three windings 74, 76 and 78. The phase relationship of these three voltages as it relates to circuit operation will be described in detail hereinbelow. In preferred embodiments, the windings 74, 76 and 78 are wound on a small core of ferrite material that is operated near saturation, as will be described hereinbelow.

Winding 76 provides base drive current to transistor 62 through a resistor 80, which is connected to the base of transistor 62 for limiting current flow thereto. A diode 82 is connected between the base and emitter of transistor 62 for protecting the base-emitter junction from high negative voltage when the voltage on the dotted end of base transformer winding 76 is negative with respect to the undotted end of base drive transformer winding 76.

In similar manner, winding 78 provides base drive current to transistor 64 through a resistor 84 (R4), which is connected to the base of transistor 64 for limiting current flow thereto. A diode 86 is connected between the base and emitter of transistor 64 for protecting the base-emitter from high negative voltage when the voltage on the dotted end of base transformer winding 78 is negative with respect to the undotted end of base drive transformer winding 78.

A starting circuit for high frequency inverter 60 of FIG. 1 is illustrated as comprising: a resistor 92 coupled between the positive terminal of energy storage capacitor 54, and one end of lamp electrode 15, resistor 100 connected from the other end of lamp electrode 15 to one end of lamp electrode 13, a resistor 104 and a diode 105 coupled in parallel to each other and in series with a capacitor 106; and a DIAC 108 coupled between the junction joining resistor 104 and diode 105 with capacitor 106 and the base of transistor 64.

An inductor 110 limits current provided to the lamp by the inverter and, together with capacitor 102, forms a resonant circuit that is used to generate a sufficiently high voltage to start the lamp. Capacitors 96 and 98, respectively, are used to control current flowing through lamp electrodes 13 and 15, respectively.

Operation of ballast 10 of FIG. 1 is as follows. When AC power is first applied to the input of the ballast, energy storage capacitor 54 is charged to the peak voltage of the AC power line waveform through the full wave bridge 28, inductor 42, and diodes 48 and 52. In addition, capacitor 106 is charged by the DC voltage at the output of the full wave bridge 28, through the series path connection of inductor 42, diodes 48 and 52, resistor 92, electrode 15, resistor 100, electrode 13, inductor 110, winding 74 and resistor 104, respectively. In addition, the series combination of capacitors 44 and 46 is charged to the peak voltage of the AC power line waveform, with the distribution of the total voltage between capacitors 44 and 46 being determined by the respective voltage drops across resistor 92 and the combination of the voltage drops across resistors 100 and 104 and the voltage across capacitor 106. When capacitor 106 has charged to the breakdown voltage of DIAC 108, (i.e., with the breakdown voltage being substantially less than the peak of the AC power line voltage), the voltage across DIAC 108 quickly drops by a significant amount, and the energy stored in capacitor 106 is applied to the base of transistor 64. This base current causes transistor 64 to start conducting and to start drawing current from capacitors 46 and 102. The current drawn by transistor 64 flows into the undotted end of base drive transformer winding 74 and out of the dotted end of base drive transformer winding 74. This increasing current causes the undotted end of transformer winding 74 to have a positive voltage relative to the dotted end of transformer winding 74. Due to the coupling between base drive transformer windings 74 and 78, the increasing current flowing in winding 74 also produces a positive voltage on the undotted end of base drive transformer winding 78 relative to the dotted end of base drive transformer winding 78. This positive voltage drives current into the base of transistor 64, maintaining transistor 64 in the conducting state as long as the current drawn by transistor 64 is increasing. During this time, the dotted end of base transformer winding 76 is negative relative to the undotted end of base drive transformer winding 76, such that that transistor 62 is held in the off or non-conducting state.

As the energy stored in capacitors 46 and 102 is consumed, the rate of change of current drawn by transistor 64 changes from increasing to decreasing. At that point, the polarity of the voltage across base drive transformer winding 74 reverses, as does the voltage across base drive transformer windings 76 and 78, since they are coupled to winding 74. When the polarity of the voltage across the windings of the base drive transformer reverses, the undotted end of base drive transformer winding 78 becomes negative relative to its dotted end, causing transistor 64 to turn off. When transistor 64 turns off, the abrupt decrease in current flowing through base drive transformer winding 74 causes the magnitude of the voltage across all three base drive transformer windings, 74, 76 and 78 to increase, while maintaining the same voltage polarity as those windings had during the immediately preceding time, that is, when the current drawn by transistor 64 was decreasing.

At the time that the voltage on the undotted end of base drive transformer winding 78 becomes negative relative to its dotted end, the voltage on the dotted end of base drive transformer winding 76 becomes positive relative to the voltage on its undotted end. When this positive voltage exceeds the base-to-emitter threshold voltage of transistor 62, transistor 62 is turned on, and current begins to flow out of the emitter of transistor 62 into the dotted end of base drive transformer winding 74 and also into the end of inductor 110 that is connected to the undotted end of base drive transformer winding 74. This increasing current further increases the positive voltage on the dotted end of base drive transformer winding 76 relative to its undotted end, and drives transistor 62 into saturation. Transistor 62 remains in saturation until either one of two events takes place: a) the current flowing through base drive transformer winding 74 begins to decrease, or b) the ferrite core around which base drive transformer windings 74, 76 and 78 are wound reaches saturation. If the first of these conditions is met, the polarity of the voltage across the three base drive transformer windings will reverse, and transistor 62 will be turned off while transistor 64 will be turned on. If the second of these two conditions, i.e., ferrite core saturation, is met, the voltage on base drive transformer winding 76 that is causing 62 to conduct will go to zero. This will cause transistor 62 to stop conducting, which will also cause a sudden decrease in the current flowing into the dotted end of base drive transformer winding 74. This drop in current through base drive transformer winding 74 will cause the undotted end of base drive transformer windings 74, 76 and 78 to become positive relative to the dotted ends of these three windings. The positive voltage on the undotted end of base drive transformer winding 78 relative to its dotted end will turn on transistor 64, while at the same time the negative voltage on the dotted end of base drive transformer winding 76 relative to its undotted end will cause transistor 62 to remain in the off state. The next time the ferrite core saturates or the current flowing through base drive winding 74 decreases, transistor 64 will be turned off and transistor 62 will be turned on in the manner described above. The operation of the inverter is, therefore, self-sustaining.

Once the inverter has achieved self-sustaining oscillation, the inverter starting circuit ceases to operate. In preferred embodiments, the values of resistor 104 and capacitor 106 are chosen so that the charging time constant for capacitor 106 is substantially less than a threshold value (e.g., 1 second), but also substantially longer than the high frequency cycle time of the inverter. In addition, diode 105 is connected in such a manner that any small amount of energy deposited in capacitor 106 when transistor 62 is conducting and transistor 64 is non-conducting will be removed through diode 105 during the next half cycle of the high frequency period when transistor 64 is conducting thereby preventing DIAC 108 from conducting as long as the inverter is oscillating in a self-sustaining manner as described above.

The current flowing alternately out of the emitter of transistor 62 and into the collector of transistor 64 drives a resonant circuit created by inductor 110 and capacitors 102, 96 and 98. A portion of the current flowing through capacitor 102 also flows through electrodes 13 and 15 and heats them to their thermionic emission temperature. Capacitors 96 and 98, respectively, shunt excess current around electrodes 13 and 15, respectively. When the resonant circuit is operated near or at its resonant frequency, a high voltage builds up across capacitor 102 that creates a high electric field between lamp electrodes 13 and 15 and will ignite the gasses in the discharge lamp 12, especially once electrodes 13 and 15 have reached thermionic emission temperature. Once the gas discharge inside the lamp has been initiated, the relatively low impedance of the discharge absorbs energy from the resonant circuit and reduces the voltage that is developed across capacitor 102. The inverter operates at a frequency determined primarily by the following: saturation characteristics of the ferrite core used for the base drive transformer, the number of windings used for base drive transformer winding 74, the value of inductor 110, the value of capacitor 102, the impedance of lamp 12, and the voltage on capacitor 54, which serves as the DC power source for the inverter.

Ballast 10 of FIG. 1 provides dimming operation as follows. Capacitor 54 is charged to the peak voltage of the AC input waveform through full wave bridge 28, inductor 42 and diodes 48 and 52, as described above. When a suitable phase cut dimmer 111 is placed in the power circuit feeding the compact fluorescent lamp system and adjusted to turn on after the time during each power line voltage cycle when the voltage waveform is at its peak value, the peak voltage of the AC input waveform applied to the input of the ballast is reduced; and, therefore, the voltage on energy storage capacitor 54 is reduced. When the voltage across capacitor 54 is reduced, the value of the high frequency voltage at junction 66, the output of inverter 60 is likewise reduced, and current flowing through the lamp decreases, thus reducing the lamp light output. A phase cut dimmer that is designed for the operation of incandescent lamps advantageously works properly with high power factor electronic lamp ballasts according to preferred embodiments of the present invention. As another advantage, ballasts configured in accordance with preferred embodiments of the present invention provide the ability to dim the discharge lamps to low levels, while maintaining steady, non-flickering operation. Exemplary suitable phase cut dimmers are sold by Lutron Electronics Company, Inc. (e.g., models D-600R, D-600P, and D-603P) and by Leviton Manufacturing Company, Inc. (e.g., models 6602, 6681, and 6682). In addition, Chatfield U.S. Pat. No. 5,101,142 shows a phase cut dimmer in FIG. 7a, for example.

As set forth above, most compact fluorescent lamp ballasts draw current from the power line only during a relatively short time period near the peak of the input voltage waveform. This creates a highly distorted input current waveform that in turn causes the input power factor to be low, typically about 0.5 to 0.6. In accordance with preferred embodiments of the present invention, the ballast is configured to draw current from the AC power line during substantially more than half of the duration of the input voltage waveform and advantageously provide high power factor as well as dimming operation.

The input power factor correction circuit operates to provide high power factor, as well as improved dimming capability, in the following manner. In accordance with preferred embodiments, the inverter may operate at a frequency of at least 30 kHz, for example. Therefore, the inverter switches at least 500 times for each full cycle of the 60 Hz input voltage. Or, conversely, during each full cycle of the 60 Hz input voltage, the inverter switches at least 500 times. During each cycle of the inverter, there will be one half-cycle of the high frequency period when current is flowing toward the junction of capacitors 44 and 46 from lamp electrode 15, and one half-cycle of the high frequency period when current is flowing from the junction of capacitors 44 and 46 toward lamp electrode 15. During those half-cycles of the high frequency period when current is flowing from the junction of capacitors 44 and 46 toward lamp electrode 15, capacitor 44 draws current from the output of the full wave bridge 28, even when the output voltage of the full bridge is significantly lower than the voltage on capacitor 54. During these half-cycles of the high frequency period, the energy extracted from the full wave rectifier 28 by capacitor 44 will charge capacitor 44 with a voltage that is positive on the side of capacitor 44 that is connected to the junction of diodes 48 and 52 relative to the side of capacitor 44 that is connected to capacitor 46 and lamp electrode 15. During the next half-cycle of the high frequency period, the high frequency current will flow from lamp electrode 15 toward the junction of capacitors 44 and 46. When current flows in this direction, the energy stored in capacitor 44 will be transferred to capacitor 54 through diode 52. Advantageously, therefore, power factor correction circuit 40 extracts energy from the AC power line via full wave bridge 28, diode 48, diode 52 and capacitor 44, even when the peak voltage of the AC power waveform is substantially lower than the voltage of capacitor 54, and then transfers the energy stored in capacitor 44 to capacitor 54. Even though capacitor 44 is preferably substantially smaller than capacitor 54, this energy transfer operation takes place at least 500 times for each cycle of the 60 Hz input voltage waveform, so only a relatively small amount of energy has to be transferred during each cycle of the high frequency inverter in order to maintain a full charge on capacitor 54.

By way of example only, a ballast of FIG. 1 for operating a 15-watt CFL may have the following component values: Capacitor 22=27,000 pF; Capacitor 43=4,700 pF; Capacitor 54=22 µF; Capacitor 106=47,000 pF; Capacitor 44=47,000 pF; Capacitor 46=8,200 pF; Capacitor 102=4,700 pF; Capacitor 96=100,000 pF; Capacitor 98=100,000 pF; Inductor 20=1.6 mH; Inductor 42=0.62 mH; Inductor 110=1.4 to 1.45 mH; Resistor 18 is a negative temperature coefficient (NTC) resistor with a room temperature resistance of 10 to 15 ohms, such as Model AMF72-10D made by Amwei Thermistor Co., Ltd., Shenzhen, P.R. China; Resistor 92=330 k ohms; Resistor 104=330 k ohms; Resistor 80=5.1 ohms; Resistor 84=5.1 ohms; Resistor 100=510 k ohms; and the base drive transformer has a two-turn primary winding 74 and two six-turn secondary windings 76 and 78 on a 6 mm OD×3 mm ID×3 mm high ferrite core. Transistors 62 and 64 are NPN power transistors, such as Model MJE13007 made by Motorola Corporation; Diodes 24, 25, 26, 27, 48, 50, 51, 52, 82, 86 and 105 are 1 Amp, 1000 volt silicon diodes such as type 1N4007 made by Fairchild Semiconductor; and DIAC 108 is a trigger diode with a 28 to 36 volt breakdown voltage, such as Model DB3 made by STMicroelectronics.

As another example, a ballast according to FIG. 1 may have the following values when operating a 23-watt CFL: Capacitor 22=27,000 pF; Capacitor 43=4,700 pF; Capacitor 54=22 µF; Capacitor 106=47,000 pF; Capacitor 44=220,000 pF; Capacitor 46=10,000 pF; Capacitor 112=5,600 pF; Capacitor 96=150,000 pF; Capacitor 98=150,000 pF; Inductor 20=1.5 mH; Inductor 42=0.62 mH; Inductor 110=1.2 to 1.25 mH; Resistor 18 is a negative temperature coefficient (NTC) resistor with a room temperature resistance of 10 to 15 ohms, such as Model AMF72-10D made by Amwei Thermistor Co., Ltd., Shenzhen, P.R. China; Resistor 92=330 k ohms; Resistor 104=330 k ohms; Resistor 80=5.1 ohms; Resistor 84=5.1 ohms; Resistor 114=510 k ohms; and the base drive transformer has a two-turn primary winding 74 and two six-turn secondary windings 76 and 78 on a 6 mm OD×3 mm ID×3 mm high ferrite core. Transistors 62 and 64 are NPN power transistors, such as Model MJE13007 made by Motorola Corporation; Diodes 24, 25, 26, 27, 48, 50, 51, 52, 82, 86 and 105 are 1 Amp, 1000 volt silicon diodes such as type 1N4007 made by Fairchild Semiconductor; and DIAC 108 is a trigger diode with a 28 to 36 volt breakdown voltage, such as Model DB3 made by STMicroelectronics.

Figure 2:
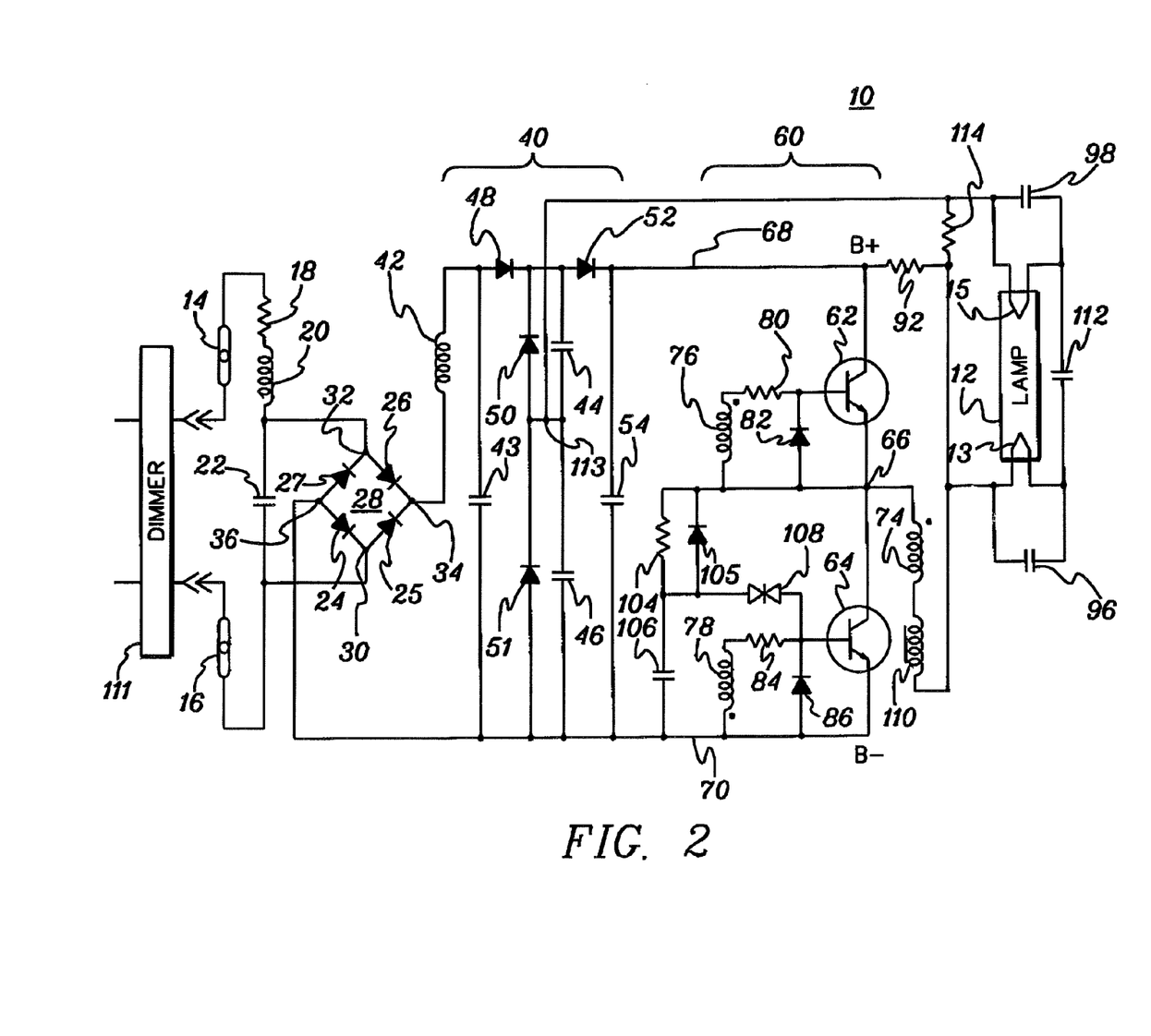
FIG. 2 illustrates an alternative embodiment of a dimmable, high power factor ballast in accordance with an aspect of the present invention.

FIG. 2 illustrates an alternative embodiment of a dimmable, high power factor ballast in accordance with the present invention. In one aspect, the embodiment of FIG. 2 differs from that of FIG. 1 in that there is a capacitor 112 coupled across the lamp electrodes, as opposed to the resistor-capacitor parallel combination as in FIG. 1. Instead, a resistor 114 is connected between the junction joining inductor 110 and electrode 13 and the junction joining electrode 15 and capacitors 44 and 46. Resistor 92, resistor 104, capacitor 106, diode 105, and DIAC 108 form the starting circuit for the high frequency inverter.

Inductor 110 limits the current provided to the lamp by the inverter and, together with capacitor 112, forms a resonant circuit that is used to generate a high voltage to help start the lamp. Capacitors 96 and 98 are used to control the current flowing through the respective lamp electrodes.

The ballast of FIG. 2 operates in the following manner. When AC power is first applied to the input of the ballast, energy storage capacitor 54 is charged to the peak voltage of the AC power line waveform through the full wave bridge 28, inductor 42 and diodes 48 and 52. During the same initial period when capacitor 54 is being charged by the output of the full wave bridge, the series combination of capacitors 44 and 46 is charged to the peak of the voltage of the AC power line through the same circuit that charges capacitor 54, with the exception of diode 52; that is, full wave bridge 28, inductor 42 and diode 48. The distribution of the initial voltage between capacitors 44 and 46 is a function of the relative sizes of these two capacitors and the relative values of resistors 92 and 104. In a preferred embodiment, for example, capacitor 46 will initially charge to a voltage that is at least half the peak voltage of the AC power line.

At the same time that capacitors 54, 44 and 46 are charged as described above, capacitor 106 is charged by the DC voltage on capacitor 54 through the series connection of resistor 92, inductor 110, winding 74 and resistor 104. When capacitor 106 has charged to the breakdown voltage of DIAC 108 (the breakdown voltage being substantially less than the peak of the AC power line voltage), the voltage across the DIAC quickly drops by a significant amount, and the energy stored in capacitor 106 is applied to the base of transistor 64. This base current applied to transistor 64 causes it to start conducting and to start drawing current from capacitor 46 through lamp electrode 15, capacitor 112, lamp electrode 13, inductor 110 and base current transformer winding 74. The current drawn by transistor 64 flows into the undotted end of base drive transformer winding 74 and out of the dotted end of base drive transformer winding 74. This increasing current causes the undotted end of transformer winding 74 to have a positive voltage relative to the dotted end of transformer winding 74. Due to the coupling between base drive transformer windings 74 and 78, the increasing current flowing in winding 74 also produces a positive voltage on the undotted end of base drive transformer winding 78 relative to its dotted end. This positive voltage drives current into the base of transistor 64, maintaining transistor 64 in the conducting state as long as the current drawn by transistor 64 is increasing. At this same time, the dotted end of base transformer winding 76 is negative relative to its undotted end, such that transistor 62 is held in the off or non-conducting state.

As the energy stored in capacitor 112, and hence the voltage across capacitor 112, increases, the rate of change of the current drawn by transistor 64 changes from increasing to decreasing. At that point, the polarity of the voltage across base drive transformer winding 74 reverses, as does the voltage across base drive transformer windings 76 and 78, since they are coupled to winding 74. When the polarity of the voltage across the windings of the base drive transformer reverses, the undotted end of base drive transformer winding 78 becomes negative relative to its dotted end, causing transistor 64 to turn off. When transistor 64 turns off, the abrupt decrease in the current flowing through base drive transformer winding 74 causes the magnitude of the voltage across all three base drive transformer windings 74, 76 and 78 to increase, while maintaining the same voltage polarity as those windings had during the immediately preceding time, that is when the current drawn by transistor 64 was decreasing.

At the time that the voltage on the undotted end of base drive transformer winding 78 becomes negative relative to its dotted end, the voltage on the dotted end of base drive transformer winding 76 becomes positive relative to the voltage on its undotted end. When this positive voltage exceeds the base-to-emitter threshold voltage of transistor 62, transistor 62 is turned on and current begins to flow out of the emitter of transistor 62 into the dotted end of base drive transformer winding 74 and also into the end of inductor 110 that is connected to the undotted end of base drive transformer winding 74. This increasing current will further increase the positive voltage on the dotted end of base drive transformer winding 76 relative to its undotted end, and drive transistor 62 into saturation. Transistor 62 remains in saturation until either one of two events takes place: a) the current flowing through base drive transformer winding 74 begins to decrease, or b) the ferrite core around which base drive transformer windings 74, 76 and 78 are wound reaches saturation. If the first of these conditions is met, the polarity of the voltage across the three base drive transformer windings will reverse and transistor 62 will be turned off while transistor 64 will be turned on. If the second of these two conditions, i.e., ferrite core saturation, is met, the voltage on base drive transformer winding 76 that is causing 62 to conduct will go to zero. This will cause transistor 62 to stop conducting, which will also cause a sudden decrease in the current flowing into the dotted end of base drive transformer winding 74. This drop in current through base drive transformer winding 74 will cause the undotted ends of base drive transformer windings 74, 76 and 78 to become positive relative to their dotted ends. The positive voltage on the undotted end of base drive transformer winding 78 relative to its dotted end will turn on transistor 64, while at the same time the negative voltage on the dotted end of base drive transformer winding 76 relative to its undotted end will cause transistor 62 to remain in the off state. The next time that the ferrite core saturates or the current flowing through base drive winding 74 decreases, transistor 64 will be turned off and transistor 62 will be turned on in the manner described above. The operation of the inverter is therefore self-sustaining.

Once the inverter has achieved self-sustaining oscillation, the starting circuit comprising resistor 104, capacitor 106 and DIAC 108, described above, ceases to operate. In preferred embodiments, the values of resistor 104 and capacitor 106 are chosen so that the charging time constant for capacitor 106 is substantially less than a threshold value, e.g., 1 second, but also substantially longer than the high frequency cycle time of the inverter. In addition, diode 105 is connected in such a manner that any small amount of energy deposited in capacitor 106 when transistor 62 is conducting and transistor 64 is non-conducting will be removed through diode 105 during the next half cycle of the high frequency period when transistor 64 is conducting thereby preventing DIAC 108 from conducting as long as the inverter is oscillating in a self-sustaining manner as described above.

The current flowing alternately out of the emitter of transistor 62 or into the collector of transistor 64 drives a resonant circuit created by inductor 110 and capacitors 96, 98 and 112. A portion of the current flowing through capacitor 112 also flows through lamp electrodes 13 and 15 and heats them to their thermionic emission temperature. Capacitors 96 and 98, respectively, shunt excess current around electrodes 13 and 15, respectively. When the resonant circuit described above is operated near or at its resonant frequency, a high voltage builds up across capacitor 112 that creates a high electric field between lamp electrodes 13 and 15 and will ignite the gasses in discharge lamp 12, especially once electrodes 13 and 15 have reached thermionic emission temperature. Once the gas discharge inside the lamp has been initiated, the relatively low impedance of this discharge absorbs energy from the resonant circuit and reduces the voltage that is developed across capacitor 112. The inverter operates at a frequency determined primarily by the saturation characteristics of the ferrite core used for the base drive transformer, the number of windings used for base drive transformer primary winding 74, the value of inductor 110, the value of capacitor 112, the impedance of lamp 12, and the voltage on capacitor 54, which serves as the DC power source for the inverter.

The lamp of FIG. 2 is dimmed in a similar manner using a dimmer 111 as described above with reference to FIG. 1.

The input power factor correction circuit operates in the following manner. In preferred embodiments, the inverter may operate at a frequency of at least 30 kHz, for example. Therefore, the inverter switches at least 500 times for each full cycle of the 60 Hz input voltage. Or, conversely, during each full cycle of the 60 Hz input voltage the inverter will switch at least 500 times. During each cycle of the inverter there will be one half-cycle of the high frequency period when current is flowing toward the lamp electrode 15 from the junction of capacitors 44 and 46 and diodes 50 and 51 (junction 113 in FIG. 2), and one half-cycle of the high frequency period when current is flowing from the lamp electrode 15 toward junction 113. During those half-cycles of the high frequency period when current is flowing toward lamp electrode 15 from junction 113, capacitor 44 will draw current from the output of the full wave bridge 28, even when the output voltage of full wave rectifier 28 is significantly lower than the voltage on capacitor 54. During these half-cycles of the high frequency period the energy extracted from the full wave rectifier 28 by capacitor 44 will charge capacitor 44 with a voltage that is positive on the side of capacitor 44 that is connected to the junction of diodes 48 and 52 relative to the side of capacitor 46 that is connected to junction 113. During the following half-cycle of the high frequency period, the high frequency current will flow from lamp electrode 15 toward junction 113. When the current flows in this direction, the energy stored in capacitor 44 will be transferred to capacitor 54 through diode 52. Advantageously, therefore, power factor correction circuit 40 extracts energy from the AC power line via full wave bridge 28 and capacitor 44, even when the peak voltage of the AC power waveform is substantially lower than the voltage of capacitor 54, and then transfers the energy stored in capacitor 44 to capacitor 54. Even though capacitor 44 is preferably substantially smaller than capacitor 54, this energy transfer operation takes place at least 500 times for each cycle of the 60 Hz input voltage waveform, for example, so only a relatively small amount of energy has to be transferred during each cycle of the high frequency inverter in order to maintain a full charge on capacitor 54.

By way of example only, a ballast according to FIG. 2 for operating a 15-watt CFL may have the following component values: capacitor 22=27,000 pF; capacitor 54=22 µF; capacitor 106=47,000 pF; capacitor 43=10,000 pF; capacitor 44=4,700 pF; capacitor 46=47,000 pF; capacitor 98=12,000 pF; capacitor 96=12,000 pF; capacitor 112=3,300 pF; inductor 20=1.8 mH; inductor 42=0.62 mH; inductor 110=2.2 to 2.4 mH; Resistor 18 is a negative temperature coefficient (NTC) resistor with a room temperature resistance of 10 to 15 ohms, such as Model AMF72-10D made by Amwei Thermistor Co., Ltd., Shenzhen, P.R. China; resistor 92=390 k ohms; resistor 104=390 k ohms; resistor 80=15 ohms; resistor 84=15 ohms; resistor 114=390 k ohms; and the base drive transformer has a two-turn primary winding 74 and two six-turn secondary windings on a 6 mm OD×3 mm ID×3 mm high ferrite core. Transistors 62 and 64 are NPN power transistors, such as Model MJE13007 made by Motorola Corporation; Diodes 24, 25, 26, 27, 48, 50, 51, 52, 82, 86 and 105 are 1 Amp, 1000 volt silicon diodes such as type 1N4007 made by Fairchild Semiconductor; and DIAC 108 is a trigger diode with a 28 to 36 volt breakdown voltage, such as Model DB3 made by STMicroelectronics. Using these component values, for example, the inverter operates over a range of frequencies ranging from approximately 60 kHz to 70 kHz when the circuit is connected directly to a 120V, 60 Hz power line.

As another example, a ballast according to FIG. 2 for operating a 23-watt CFL may have the following component values: capacitor 22=33,000 pF; capacitor 54=22 μF; capacitor 106=47,000 pF; capacitor 44=8200 pF; capacitor 46=47,000 pF; capacitor 98=10,000 pF; capacitor 96=10,000 pF; capacitor 112=7,900 pF; capacitor 43=10,000 pF; DB3 breakdown voltage between 24-32V; inductor 20=1.8 mH; inductor 42=0.62 mH; inductor 110=2.0 to 2.2 mH; Resistor 18 is a negative temperature coefficient (NTC) resistor with a room temperature resistance of 10 to 15 ohms, such as Model AMF72-10D made by Amwei Thermistor Co., Ltd., Shenzhen, P.R. China; resistor 92=390 k ohms; resistor 104=390 k ohms; resistor 80=12 ohms; resistor 84=12 ohms; resistor 114=390 k ohms; and the base drive transformer has a two-turn primary winding 74 and two six-turn secondary windings on a 6 mm OD×3 mm ID×3 mm high ferrite core. Transistors 62 and 64 are NPN power transistors, such as Model MJE13007 made by Motorola Corporation; Diodes 24, 25, 26, 27, 48, 50, 51, 52, 82, 86 and 105 are 1 Amp, 1000 volt silicon diodes such as type 1N4007 made by Fairchild Semiconductor; and DIAC 108 is a trigger diode with a 28 to 36 volt breakdown voltage, such as Model DB3 made by STMicroelectronics. Using these component values, for example, the inverter operates over a range of frequencies ranging from approximately 60 kHz to 70 kHz when the circuit is connected directly to a 120V, 60 Hz power line.

Figure 3:
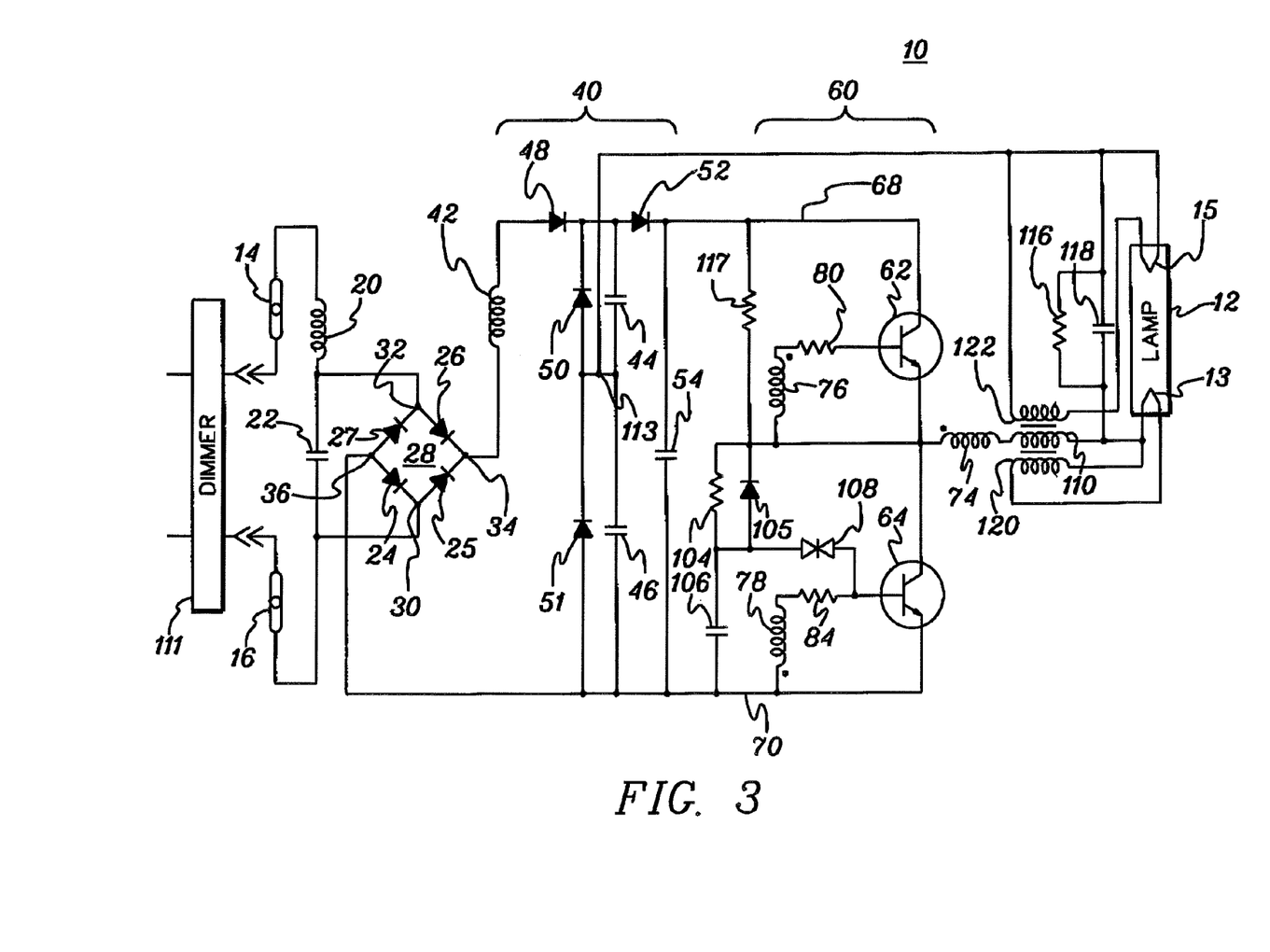
FIG. 3 illustrates another alternative embodiment of a dimmable, high power factor ballast in accordance with an aspect of the present invention.

FIG. 3 schematically illustrates another embodiment of a high power factor ballast 10. The ballast shown in FIG. 3 uses two additional windings 120 and 122 on series inductor 110, thereby effectively using this inductor also as a transformer, instead of providing current to heat the electrodes by placing one of the resonating capacitors on the opposite side of the lamp from the inverter (e.g., capacitor 112 of FIG. 2). One of additional windings 120 on inductor 110 is connected directly to lamp electrode 13 while the other additional winding 122 on inductor 110 is connected to lamp electrode 15. In this manner, heating power is supplied to the lamp electrodes whenever current is flowing in inductor 110.

Figure 4:
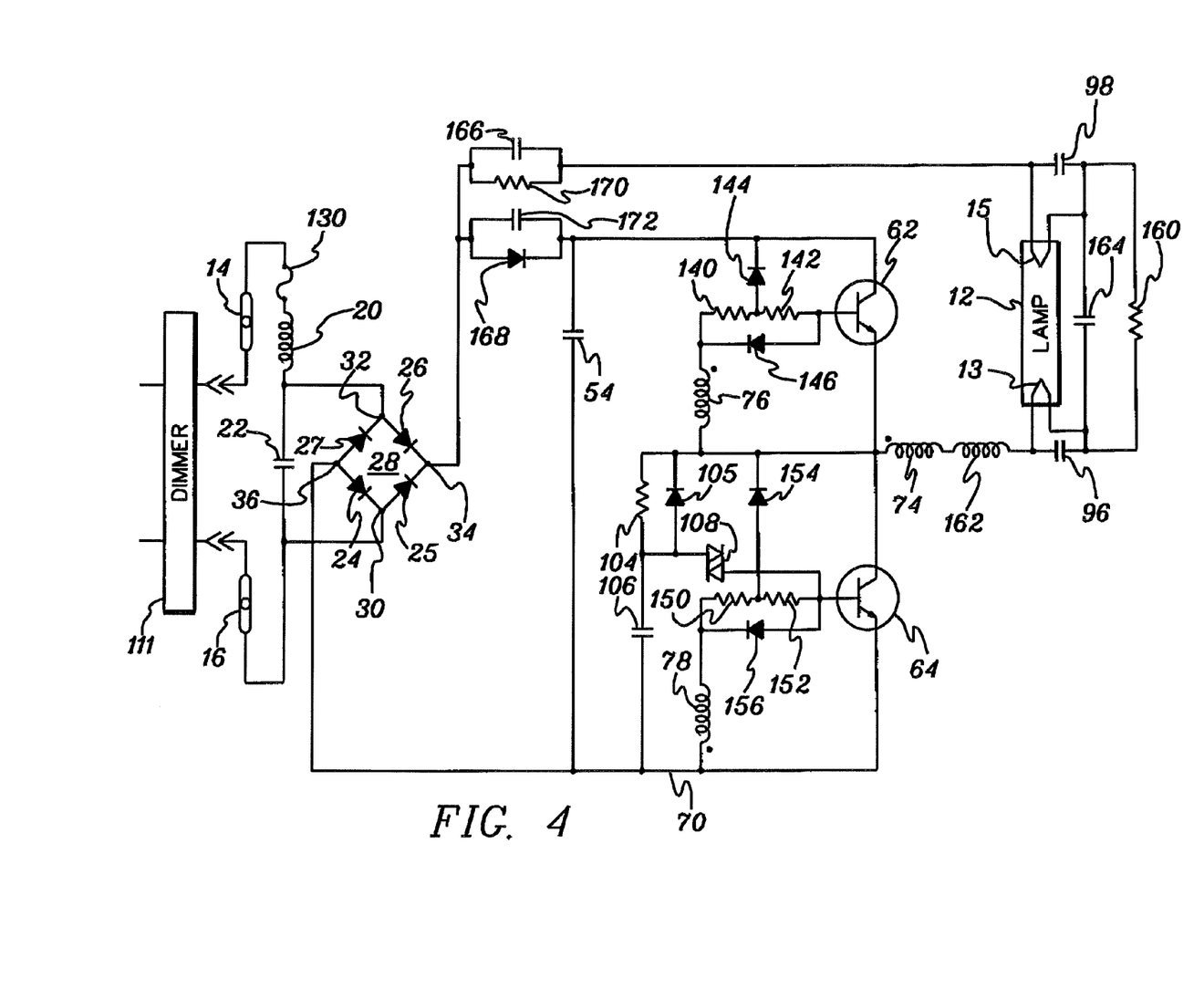
FIG. 4 illustrates another alternative embodiment of a dimmable, high power factor ballast in accordance with an aspect of the present invention.

FIG. 4 shows the schematic diagram of another alternative embodiment of a dimmable, high power factor ballast for operating discharge lamps according to the present invention. FIG. 4 illustrates use of a fuse 130, mentioned hereinabove, for providing protection in case of an electrical failure in the ballast. The power factor correction circuit for the embodiment of FIG. 4 comprises a parallel combination of a capacitor 166 and a resistor 170 coupled between junction 34 and lamp electrode 15; and a parallel combination of a diode 168 and a capacitor 172 coupled between junction 34 and the collector of transistor 62, and will be described below.

In the embodiment of FIG. 4, winding 76 provides base drive current to transistor 62 through resistors 140 and 142, which are coupled to the base of transistor 62 for limiting the current flow thereto. A diode 144, coupled between the junction joining resistors 140 and 142 and the collector of transistor 62, further limits the base current provided to transistor 62 when transistor 62 is fully on in order to allow transistor 62 to be turned off quickly. A diode 146, coupled across resistors 140 and 142, helps turn off transistor 62 quickly by providing a low impedance path for base current extraction when the dotted end of winding 76 is negative relative to the emitter of transistor 62. When operating at a relatively high frequency, the power loss in the inverter circuit is reduced when the switching transistors are turned on and off quickly.

In the embodiment of FIG. 4, winding 78 provides base drive current to transistor 64 through resistors 150 and 152, which are coupled to the base of transistor 64 for limiting the current flow thereto. A diode 154, coupled between the junction joining resistors 150 and 152 and the collector of transistor 64, further limits the base current provided to transistor 64 when transistor 64 is fully on in order to allow transistor 64 to be turned off quickly. A diode 156, coupled across resistors 150 and 152, helps turn off transistor 64 quickly by providing a low impedance path for base current extraction when the dotted end of winding 78 is negative relative to the emitter of transistor 64. When operating at a relatively high frequency, the power loss in the inverter circuit is reduced when the switching transistors are turned on and off quickly.

In the embodiment of FIG. 4, resistors 104 and 160, capacitor 106, diode 105 and DIAC 108 form the starting circuit for the high frequency inverter. An inductor 162 coupled in series with base drive transformer primary winding 74 limits the current provided to the lamp by the inverter and, together with capacitor 96, capacitor 98, capacitor 164 and capacitor 166, form a resonant circuit that is used to generate a high voltage to help start the lamp. The placement of capacitor 164 is chosen to cause current to flow through the two lamp electrodes, 13 and 15. Capacitors 96 and 98, respectively, are used to control the current flowing through lamp electrodes, 13 and 15, respectively.

The circuit operates in the following manner. When AC power is first applied to the input of the ballast, energy storage capacitor 54 is charged to the peak voltage of the AC power line waveform through the full wave bridge 28 and diode 168. In addition, capacitor 106 is charged by the DC voltage at the output of the full wave bridge 28 through the series connection of a resistor 170, electrode 15, resistor 160, electrode 13, inductor 162, winding 74 and resistor 104. Capacitor 164 is charged by the voltage drop across resistor 160, and capacitor 166 is charged by the voltage drop across resistor 170. When capacitor 106 has charged to the breakdown voltage of DIAC 108 (the breakdown voltage being substantially less than the peak of the AC power line voltage), the voltage across the DIAC quickly drops by a significant amount, and the energy stored in capacitor 106 is applied to the base of transistor 64. This base current causes transistor 64 to start conducting and to start drawing current from capacitors 166 and 164. The current drawn by transistor 64 flows into the undotted end of base drive transformer winding 74 and out of its dotted end. This increasing current causes the undotted end of transformer winding 74 to have a positive voltage relative to its dotted end. Due to the coupling between base drive transformer windings 74 and 78, the increasing current flowing in winding 74 also produces a positive voltage on the undotted end of base drive transformer winding 78 relative to its dotted end. This positive voltage drives current into the base of transistor 64, maintaining transistor 64 in the conducting state as long as the current drawn by transistor 64 is increasing. At this same time, the dotted end of base transformer winding 76 is negative relative to its undotted end, such that transistor 62 is held in the off or non-conducting state.

As the energy stored in capacitors 164 and 166 is consumed, the rate of change of the current drawn by transistor 62 changes from increasing to decreasing. At that point the polarity of the voltage across base drive transformer winding 74 reverses, as does the voltage across base drive transformer windings 76 and 78, since they are coupled to winding 74. When the polarity of the voltage across the windings of the base drive transformer reverses, the undotted end of base drive transformer winding 78 becomes negative relative to its dotted end, causing transistor 64 to turn off. When transistor 64 turns off, the abrupt decrease in the current flowing through base drive transformer winding 74 causes the magnitude of the voltage across all three base drive transformer windings 74, 76 and 78 to increase, while maintaining the same voltage polarity as those windings had during the immediately preceding time, that is when the current drawn by transistor 64 was decreasing.

At the same time that the voltage on the undotted end of base drive transformer winding 78 becomes negative relative to its dotted end, the voltage on the dotted end of base drive transformer winding 76 becomes positive relative to the voltage on its undotted end. When this positive voltage exceeds the base-to-emitter threshold voltage of transistor 62, transistor 62 is turned on and current begins to flow out of the emitter of transistor 62 into the dotted end of base drive transformer winding 74 and also into the end of inductor 162 that is connected to the undotted end of base drive transformer winding 74. This increasing current will further increase the positive voltage on the dotted end of base drive transformer winding 76 relative to its undotted end, and drives transistor 62 into saturation. Transistor 62 will continue to be held in saturation until either one of two events takes place: a) the current flowing through base drive transformer winding 74 begins to decrease, or b) the ferrite core around which base drive transformer windings 74, 76 and 78 are wound on reaches saturation. If the first of these conditions is met, the polarity of the voltage across the three base drive transformer windings will reverse, and transistor 62 will be turned off while transistor 64 will be turned on. If the second of these two conditions, i.e., ferrite core saturation, is met, the voltage on base drive transformer winding 76 that is causing transistor 62 to conduct will go to zero. This will cause transistor 62 to stop conducting, which will also cause a sudden decrease in the current flowing into the dotted end of base drive transformer winding 74. This drop in current through base drive transformer winding 74 will cause the undotted ends of base drive transformer windings 74, 76 and 78 to become positive relative to their dotted ends. The positive voltage on the undotted end of base drive transformer winding 78 relative to the dotted end of that same winding will turn on transistor 64, while at the same time the negative voltage on the dotted end of base drive transformer winding 76 relative to its undotted end will cause transistor 62 to remain in the off state. The next time that the ferrite core saturates or the current flowing through base drive winding 74 decreases, transistor 64 will be turned off and transistor 62 will be turned on in the manner described above. The operation of the inverter is therefore self-sustaining.

Once the inverter is has achieved self-sustaining oscillation, the inverter starting circuit described above ceases to operate. The values of resistor 104 and capacitor 54 are chosen so that the charging time constant for capacitor 54 is much less than a threshold value, e.g., 1 second, but also much longer than the high frequency cycle time of the inverter. In addition, diode 105 is connected in such a manner that any small amount of energy deposited in capacitor 54 when transistor 62 is conducting and transistor 64 is non-conducting will be removed through diode 105 during the next half cycle of the high frequency period when transistor 64 is conducting, thus preventing the inverter starting circuit from operating when the inverter is operating is the self-sustained oscillation mode.

The current flowing alternately out of the emitter of transistor 62 or into the collector of transistor 64 drives a resonant circuit created by inductor 162 and capacitors 166, 96, 98 and 164. A portion of the current flowing through capacitor 164 also flows through electrodes 13 and 15 and heats them to their thermionic emission temperature. Capacitors 96 and 98, respectively, shunt excess current around electrodes 13 and 15, respectively. When the resonant circuit is operated near or at its resonant frequency, a high voltage builds up across capacitor 164 that creates a high electric field between lamp electrodes 13 and 15 and will ignite the gasses in discharge lamp 12, especially once electrodes 13 and 15 have reached thermionic emission temperature. Once the gas discharge inside the lamp has been initiated, the relatively low impedance of this discharge absorbs energy from the resonant circuit and reduces the voltage that is developed across 164. The inverter operates at a frequency determined primarily by the saturation characteristics of the ferrite core used for the base drive transformer, the number of windings used for base drive transformer winding 74, the value of inductor 162, the values of capacitors 164 and 166, the impedance of lamp 12, and the voltage on capacitor 54, which serves as the DC power source for the inverter.

The lamp of FIG. 4 is dimmed in a similar manner using a dimmer 111 as described above with reference to FIGS. 1-3.

The input power factor correction circuit operates in the following manner. In preferred embodiments, the inverter operates at a frequency of at least 30 kHz, as described above. During each cycle of the inverter there will be one half-cycle of the high frequency period when current is flowing toward the lamp electrode 15 from the parallel combination of capacitor 166 and resistor 170, and one half-cycle of the high frequency period when current is flowing from the lamp electrode 15 toward the parallel combination of capacitor 166 and resistor 170. During those half-cycles of the high frequency period when current is flowing toward lamp electrode 15 from the parallel combination of capacitor 166 and resistor 170, capacitor 166 will draw current from the output of the full wave bridge 28, even when the output voltage of full wave rectifier 28 is significantly lower than the voltage on capacitor 54. During these half-cycles of the high frequency period the energy extracted from the full wave rectifier 28 by capacitor 166 will charge capacitor 166 with a voltage that is positive on the side of capacitor 166 connected to full wave bridge 28 relative to the side of capacitor 166 connected to lamp electrode 15. During the next half-cycle of the high frequency period, the high frequency current will flow from lamp electrode 15 toward the parallel combination of capacitor 166 and resistor 170. When the current flows in this direction, the energy stored in capacitor 166 will be transferred to capacitor 54 through diode 168. Therefore, the power factor correction circuit extracts energy from the AC power line via full wave bridge 28 and capacitor 166, even when the peak voltage of the AC power waveform is substantially lower than the voltage of capacitor 54, and then transfers the energy stored in capacitor 166 to capacitor 54. Even though capacitor 166 is preferably substantially smaller than capacitor 54, this energy transfer operation takes place at least 500 times for each cycle of the 60 Hz input voltage waveform, for example, so only a relatively small amount of energy has to be transferred during each cycle of the high frequency inverter in order to maintain a full charge on capacitor 54.

By way of example, a ballast according to FIG. 4 may have the following values when operating a 15-watt CFL: Capacitor 22=27,000 pF; Capacitor 54=22 μF; Capacitor 106=47,000 pF; Capacitor 172=4,700 pF; Capacitor 166=47,000 pF; Capacitor 96=12,000 pF; Capacitor 98=12,000 pF; Capacitor 164=3,300 pF; Fuse 130=2 amp, 250 volt fuse; Inductor 20=1.8 mH; Inductor 162=2.2 to 2.4 mH; Resistor 170=390 k Ohms; Resistor 104=390 k Ohms; Resistor 150=15 Ohms; Resistor 152=15 Ohms; Resistor 140=15 Ohms; Resistor 142=15 Ohms; Resistor 160=390 k Ohms; and the base drive transformer has a two-turn primary winding 74 and two six-turn secondary windings on a 6 mm OD×3 mm ID×3 mm high ferrite core. Transistors 62 and 64 are NPN power transistors, such as Model MJE13003 made by Motorola Corporation; Diodes 24, 25, 26, 27, 105, 144, 146, 154, 156 and 168 are 1 Amp, 1000 volt silicon diodes such as type 1N4007 made by Fairchild Semiconductor; and DIAC 108 is a trigger diode with a 28 to 36 volt breakdown voltage, such as Model DB3 made by STMicroelectronics. Using these components, for example, the inverter operates over a range of frequencies ranging from approximately 60 kHz to 70 kHz when the circuit is connected directly to the 120-volt, 60 Hz power line.

As another example, a ballast according to FIG. 4 may have the following values when operating a 23-watt CFL: Capacitor 22=33,000 pF; Capacitor 54=22 μF; Capacitor 106=47,000 pF; Capacitor 172=5,600 pF; Capacitor 166=47,000 pF; Capacitor 96=10,000 pF; Capacitor 98=10,000 pF; Capacitor 164=4,700 pF; Fuse 130=2 amp, 250 volt fuse; Inductor 20=1.8 mH; Inductor 162=1.7 to 1.9 mH; Resistor 170=390 k Ohms; Resistor 104=390 k Ohms; Resistor 150=12 Ohms; Resistor 152=12 Ohms; Resistor 140=12 Ohms; Resistor 142=12 Ohms; Resistor 160=390 k Ohms; and the base drive transformer has a two-turn primary winding 74 and two six-turn secondary windings on a 6 mm OD×3 mm ID×3 mm high ferrite core. Transistors 62 and 64 are NPN power transistors, such as Model MJE13003 made by Motorola Corporation; Diodes 24, 25, 26, 27, 105, 144, 146, 154, 156 and 168 are 1 Amp, 1000 volt silicon diodes such as type 1N4007 made by Fairchild Semiconductor; and DIAC 108 is a trigger diode with a 28 to 36 volt breakdown voltage, such as Model DB3 made by STMicroelectronics.

Advantageously, a power factor correction circuit in accordance with preferred embodiments of the present invention causes the ballast to draw current from the AC power line over most of the 60 Hz cycle, and causes the shape of the current waveform to be approximately sinusoidal. The sinusoidal-like input current waveform is compatible with standard phase cut dimmers and insures a high input power factor, which is desirable because it reduces reactive power losses in the electrical transmission system feeding the lamp.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A ballast for operating a gas discharge lamp, comprising:
a power factor correction circuit and an energy storage capacitor coupled to the output thereof, the power factor correction circuit being configured to draw current from an AC power source during substantially more than half of the cycle of the input AC voltage waveform when substantially full power is being supplied thereto, the power factor correction circuit comprising energy transfer elements for extracting energy from the AC power source via an input rectifier, even when the peak voltage of the AC voltage waveform is substantially lower than the voltage of the energy storage capacitor, and transferring the energy to the energy storage capacitor a sufficient number of times during each cycle of the input AC voltage waveform, such that the energy storage capacitor remains substantially fully charged during steady-state ballast operation;
an inverter coupled to the power factor correction circuit, the energy storage capacitor providing DC power for the inverter; and
a starting circuit coupled for receiving AC power from the inverter and initiating a discharge in the lamp.

2. The ballast of claim 1, further having a dimmer coupled thereto for operating the lamp at variable levels of light output.

3. The ballast of claim 1, wherein the inverter comprises a resonant circuit which, when operated substantially at its resonant frequency, creates a sufficiently high electric field in the lamp to ignite the discharge therein.

4. The ballast of claim 3, wherein operation of the inverter becomes self-sustaining before initiation of the discharge.

5. The ballast of claim 1, wherein the inverter comprises a half-bridge inverter having at least two switching devices coupled in series at the output of the power factor correction circuit, and wherein the ballast further comprises a base drive transformer having at least one winding coupled at the output of the inverter and at least one winding coupled in drive circuitry for each respective switching device, the windings of the base drive circuitry being coupled to provide a predetermined phase relationship of voltages thereacross.

6. The ballast of claim 5 wherein the base drive transformer comprises a core of ferrite material that is operated near saturation.

7. The ballast of claim 1, wherein the lamp comprises a compact fluorescent lamp.

8. The ballast of claim 1, wherein the energy transfer elements comprise: an inductor having a first terminal coupled to the output of the input rectifier and having a second terminal coupled to the anode of a first diode; the cathode of the first diode being coupled to the cathode of a second diode, the anode of the second diode being coupled to the cathode of a third diode; a parallel combination of a first and a second capacitor being coupled across the parallel combination of the second and third diodes with the junction between the first and second capacitors connected to the junction between the second and third diodes; a fourth diode having its anode coupled to the cathode of the first diode and having its cathode coupled to the energy storage capacitor.

9. The ballast of claim 8, wherein the energy transfer elements further comprise a third capacitor coupled to the junction joining the inductor and the first diode.

10. The ballast of claim 1, wherein the energy transfer elements comprise: a parallel combination of a first capacitor and a resistor coupled between the output of the input rectifier and the lamp; and a parallel combination of a second capacitor and a diode coupled between the output of the input rectifier and the energy storage capacitor.

11. A method for operating a gas discharge lamp, comprising:
providing an input power factor correction circuit and an energy storage capacitor coupled to the output thereof;
operating the power factor correction circuit to draw current from an AC power source during substantially more than half of the cycle of the input AC voltage waveform when substantially full power is being supplied thereto;

extracting energy from the AC power source via an input rectifier, even when the peak voltage of the AC voltage waveform is substantially lower than the voltage of the energy storage capacitor;

transferring energy to the energy storage capacitor a sufficient number of times during each cycle of the input AC voltage waveform, such that the energy storage capacitor remains substantially fully charged during steady-state ballast operation;

providing DC power to the inverter via the energy storage capacitor; and providing AC power from the inverter to a starting circuit and initiating a discharge in the lamp.

12. The method of claim 11, further comprising operating the lamp at variable levels of light output.

13. The method of claim 11, further comprising operating the inverter substantially at its resonant frequency, thereby creating a sufficiently high electric field in the lamp to ignite the discharge therein.

14. The method of claim 13, wherein operation of the inverter becomes self-sustaining before initiation of the discharge.

15. The method of claim 11, wherein the inverter comprises a half-bridge inverter having at least two switching devices coupled in series at the output of the power factor correction circuit, and wherein the ballast further comprises a base drive transformer having at least one winding coupled at the output of the inverter and at least one winding coupled in drive circuitry for each respective switching device, the windings of the base drive circuitry being coupled to provide a predetermined phase relationship of voltages thereacross.

16. The method of claim 12 wherein the base drive transformer comprises a core of ferrite material that is operated near saturation.

17. The method of claim 8, wherein the lamp comprises a compact fluorescent lamp.

18. The method of claim 11, wherein the energy transfer elements comprise: an inductor having a first terminal coupled to the output of the input rectifier and having a second terminal coupled to the anode of a first diode; the cathode of the first diode being coupled to the cathode of a second diode, the anode of the second diode being coupled to the cathode of a third diode; a parallel combination of a first and a second capacitor being coupled across the parallel combination of the second and third diodes with the junction between the first and second capacitors connected to the junction between the second and third diodes; a fourth diode having its anode coupled to the cathode of the first diode and having its cathode coupled to the energy storage capacitor.

19. The method of claim 11, wherein the energy transfer elements further comprise a third capacitor coupled to the junction joining the inductor and the first diode.

20. The method of claim 11, wherein the energy transfer elements comprise: a parallel combination of a first capacitor and a resistor coupled between the output of the input rectifier and the lamp; and a parallel combination of a second capacitor and a diode coupled between the output of the input rectifier and the energy storage capacitor.

* * * * *